(12) United States Patent
Resende et al.

(10) Patent No.: US 7,978,629 B2
(45) Date of Patent: Jul. 12, 2011

(54) METHOD FOR NETWORK DESIGN TO MAXIMIZE DIFFERENCE OF REVENUE AND NETWORK COST

(75) Inventors: Mauricio Guilherme De Carvalho Resende, Holmdel, NJ (US); Alexandre Salles da Cunha, Belo Horizonte (BR); Abilio Lucena, Rio de Janeiro (BR); Nelson Maculan, Rio de Janeiro (BR)

(73) Assignee: AT&T Intellectual Property I, L.P., Atlanta, GA (US)

( * ) Notice: Subject to any disclaimer, the term of this patent is extended or adjusted under 35 U.S.C. 154(b) by 137 days.

(21) Appl. No.: 12/380,064

(22) Filed: Feb. 23, 2009

(65) Prior Publication Data

US 2010/0214957 A1 Aug. 26, 2010

(51) Int. Cl.
*H04L 12/28* (2006.01)
(52) U.S. Cl. .......................... 370/254; 370/255; 370/396
(58) Field of Classification Search .................. 370/254, 370/255, 238, 390, 396; 702/94, 150, 158
See application file for complete search history.

(56) References Cited

U.S. PATENT DOCUMENTS

2006/0146716 A1* 7/2006 Lun et al. ...................... 370/238

OTHER PUBLICATIONS

Alexandre Salles de Cunha, et al.; "A Relax-And-Cut Algorithm for the Prize-Collecting Steiner Problem in Graphs", Discrete Applied Mathematics; vol. 157, Issue 6, pp. 1198-1217, Mar. 28, 2009.
Abilio Lucena, et al.; "Strong Lower Bounds for the Prize-Collecting Steiner Problem in Graphs" Discrete Applied Mathematics, pp. 277-294, 2004.
Mohamed Haouari, et al.; "A Hybrid Lagrangian Genetic Algorithm for the Prize Collecting Steiner Tree Problem", Computers and Operations Research, pp. 1274-1288, 2006.
Abilio Lucena, "Non Delayed Relax-and Cut Algorithms", Annals of Operations Research, 140, pp. 375-410, 2005.
Egon Balas; "The Prize Collecting Traveling Salesman Problem"; Networks, vol. 19, pp. 621-636, 1989.
Alexandre Salles da Cunha, et al.; "Lower and Upper Bounds for the Degree-Constrained Minimum Spanning Tree Problem"; Networks, pp. 55-66, 2007.
Arie Segev; The Node-Weighted Steiner Tree Problem; Networks, vol. 17, pp. 1-17, 1987.
Celso C. Ribeiro, et al.; "Tabu Search for the Steiner Problem in Graphs"; Networks, vol. 36(2), pp. 138-146, 2000.
J. E. Beasley; "An Algorithm for the Steiner Problem in Graphs"; Networks, vol. 14, pp. 147-159, 1984.
Cees Duin et al.; "Efficient Path and Vertex Exchange in Steiner Tree Algorithms"; Networks, pp. 89-105, 1997.
Abillio Lucena; "Steiner Problem in Graphs: Lagrangean Relaxation and Cutting-Planes"; Netflow93; pp. 147-154; 1993.
Alexandre Salles da Cunha, et al.; "A Relax and Cut Algorithm for the Prize Collecting Steiner Problem in Graphs"; Mathematical Programming in Rio; pp. 72-78; Nov. 9-12, 2003.

* cited by examiner

*Primary Examiner* — Pankaj Kumar
*Assistant Examiner* — Saba Tsegaye

(57) ABSTRACT

A method determines an optimal or near-optimal conveyance network layout in which revenue from serviced customer locations is maximized while the cost of installing and/or maintaining the conveyance is minimized. The conveyance may, for example, be a fiber optic telecommunications cable or a power or utility distribution system. Algorithms in the method generate primal and dual bounds in a Prize-Collecting Steiner Tree Problem in Graphs (PCSPG). Those algorithms originate from a Lagrangian Non-Delayed Relax-and-Cut (NDRC) based approach and incorporate ingredients such as a new PCSPG reduction test, an effective Local Search procedure and a modification in the NDRC framework that allows additional reductions in duality gaps to be attained.

20 Claims, 5 Drawing Sheets

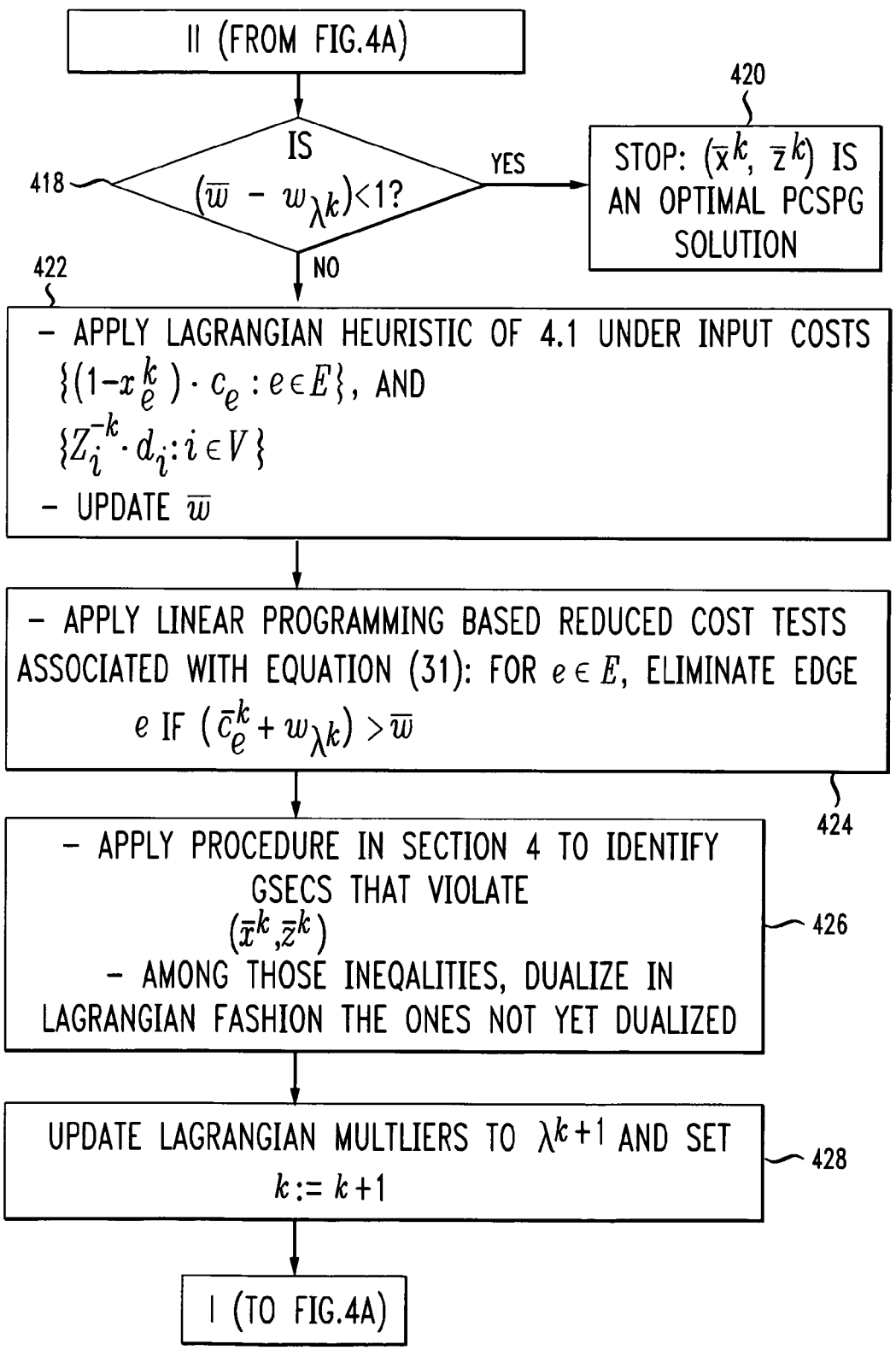

METHOD FOR NETWORK DESIGN TO MAXIMIZE DIFFERENCE OF REVENUE AND NETWORK COST

FIELD OF THE INVENTION

The present invention relates generally to the design and installation of networks, and more particularly, to systems and methods for designing networks to maximize the network profit; i.e., network revenue minus network cost.

BACKGROUND OF THE INVENTION

The present invention includes an algorithm that produces upper bounds (and feasible solutions) and lower bounds for the so-called Prize-Collecting Steiner Tree Problem in Graphs (PCSPG). The term "graphs" as used herein, means graphic portrayals that may represent edges, vertices and other aspects of undirected networks, and arcs, vertices and other aspects of directed networks. The algorithm is a heuristic or modeling tool that in computational experiments was shown to find better-quality solutions than other algorithms published in the literature.

Network planning and design is a very resource intensive process; i.e., time, effort and capital resources, undertaken by network service providers to assure that new or additional network capacity and services will meet performance, reliability and cost targets. Costs to be considered may include system as well as hardware/software design, development, installation, operation, replacement, maintenance and retirement costs. Benefits to be considered may include revenue from improvement to current services as well as possible new services or complementary services, and reduced ongoing costs such as operations, replacement, maintenance and retirement costs.

A key part of the planning process is where to place fiber optic cable when developing and deploying a fiber optic network. In this optimization problem, inputs are typically a graph or map representing a city street, where one vertex is a root vertex while other vertices are customer premises or street corners, and edges are potential locations where fiber optical cables can be placed. Each customer premises has associated with it potential revenue that could be gained if a path from the root vertex to the premises is built with fiber optical cables. Each edge has associated with it a cost to place fiber optical cable connecting the edge's endpoints. The goal of a network optimization problem is to place fiber optical cables such that the difference between the total revenue and the total cost of the fiber optical cables is maximized.

The Prize-Collecting Steiner Tree Problem in Graphs (PCSPG) is a mathematical problem wherein model edge costs and vertex profits yield a subtree optimization, in this case lowest cost. This is accomplished by minimizing the sum of the total cost of all edges in the subtree plus the total profit of all vertices not contained in the subtree.

It would be desirable to provide methods to improve the modeling and design of networks utilizing an algorithm for the PCSPG, such as utility networks (i.e. fiber optics or energy distribution) where profit generating customers and the network connecting them have to be chosen in a cost effective manner.

SUMMARY OF THE INVENTION

The present invention addresses the needs described above with an apparatus and a method for use in designing and installing networks. In one embodiment, a method is provided for installing a conveyance linking a service provider location with customer locations selected from potential customer locations located on potential conveyance routes. The installed conveyance comprises a network yielding a total profit within a predetermined bound of a maximum possible total revenue. Each potential customer location is associated with a potential customer revenue and each potential conveyance route is associated with a potential cost of the conveyance. The method comprises the steps of: formulating an optimization problem for the network as a prize-collecting Steiner tree problem in graphs (PCSPG) with potential conveyance routes $x_e$ between locations of potential customers as edges and locations of potential customers $y_i$ as vertices, the PCSPG including a plurality of network generalized subtour elimination constraint (GSEC) inequalities; replacing each $y_i$ with a complement $z_i=1-y_i$; and dualizing a subset of the GSEC inequalities in a Lagrangian fashion.

The following steps are then performed in a subgradient method (SM) iteration k on a solution $(\bar{x}^k, \bar{z}^k)$ to determine a near-optimal or optimal solution to the PCSPG: (a) obtaining a lower bound $w_{\lambda^k}$ to the PCSPG by performing Lagrangian relaxation on a vector of multipliers $\lambda$ corresponding to the GSEC inequalities; (b) terminating the iterative steps if $(\bar{w}-w_{\lambda^k})<1$, where $\bar{w}$ is a previously obtained valid upper bound, the current $(\bar{x}^k, \bar{z}^k)$ being determined to be the network solution; (c) performing a Lagrangian heuristic including a Minkoff algorithm on a solution $(\bar{x}^k, \bar{z}^k)$ using complementary costs and penalties as input and using no root vertex as input, the heuristic further including a pruning algorithm using original costs and penalties as input, the heuristic producing an upper bound replacing $\bar{w}$ if the upper bound is lower than $\bar{w}$; (d) applying a linear programming-based reduced cost test defined by the solution $(\bar{x}^k, \bar{z}^k)$ to identify edges that are not in any optimal solution, and eliminating those edges from further consideration; (e) dualizing those GSECs not yet dualized that violate the solution $(\bar{x}^k, \bar{z}^k)$, those GSECs having a cardinality greater than 2; and (f) updating the Lagrangian multipliers $\lambda$. If the iterative steps have not been terminated and if an iteration limitation criterion has not been reached, then a new iteration is initiated. If the iteration has been terminated, or if the iteration limitation criterion has been reached, then an optimal or near-optimal solution to the PCSPG is output. The conveyance is installed along selected potential conveyance routes according to the output solution.

Another embodiment of the invention is a method for determining an optimal or near-optimal conveyance network, the network including a conveyance linking a service provider location with customer locations selected from potential customer locations located on potential conveyance routes. The optimal or near-optimal conveyance network includes a network yielding a total profit within a predetermined bound of a maximum possible total profit, each potential customer location being associated with a potential customer revenue and each potential conveyance route being associated with a potential cost of the conveyance. The method comprises formulating an optimization problem for the network as a prize-collecting Steiner tree problem in graphs (PCSPG) with potential conveyance routes $x_e$ between locations of potential customers as edges and locations of potential customers $y_i$ as vertices, the PCSPG including a plurality of network generalized subtour elimination constraint (GSEC) inequalities; replacing each $y_i$ with a complement $z_i=1-y_i$; dualizing a subset of the GSEC inequalities in a Lagrangian fashion; and performing the above steps in a subgradient method (SM) iteration k.

A new iteration is initiated if the iterative steps have not been terminated and if an iteration limitation criterion has not been reached. If the iteration has been terminated, or if the iteration limitation criterion has been reached, then it is determined that the current solution to the PCSPG is the optimal or near-optimal conveyance network.

Another embodiment of the invention is a computer-usable medium having computer readable instructions stored thereon for execution by a processor to perform methods as described above for determining an optimal or near-optimal conveyance network.

These aspects of the invention and further advantages thereof will become apparent to those skilled in the art as the present invention is described with particular reference to the accompanying drawings.

BRIEF DESCRIPTION OF THE DRAWINGS

FIGS. 4A and 4B are flow charts illustrating a method in accordance with the present invention.

DETAILED DESCRIPTION OF THE INVENTION

Figure 1:
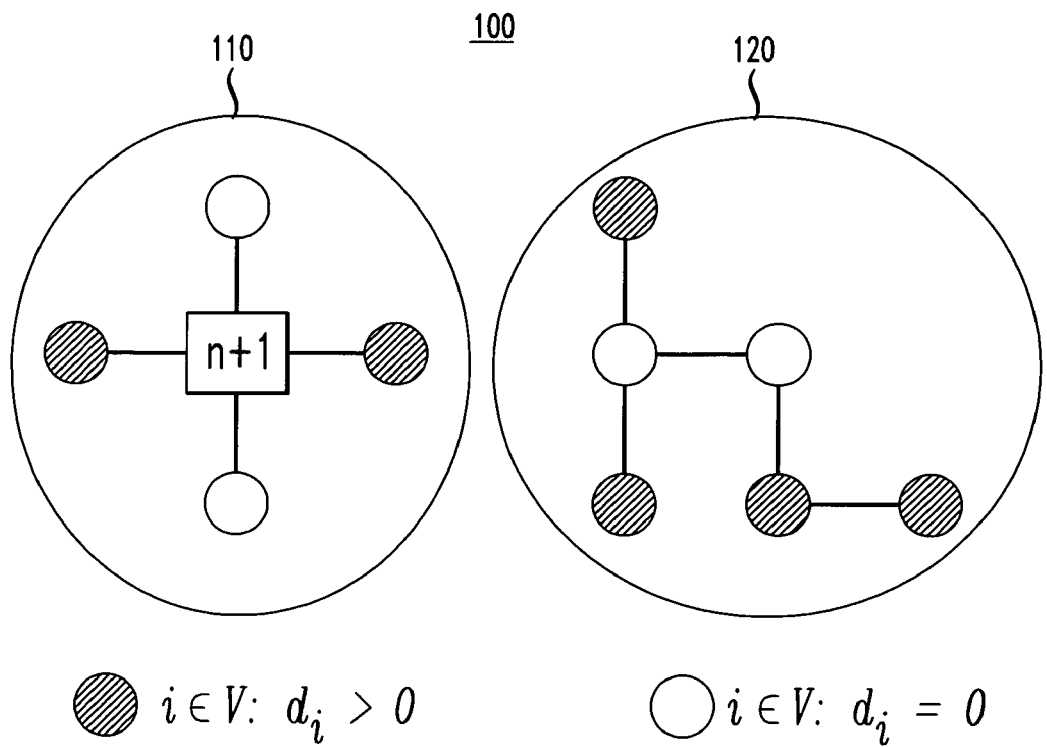
FIG. 1 illustrates a feasible PCSPG solution under the expanded graph G'.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

This application discusses primal and dual bounds for PCSPG. These originate from Lagrangian relaxations to the PCSPG formulation. Lagrangian relaxation is a relaxation technique in mathematics which works by moving hard constraints into the objective so as to exact a penalty on the objective if they are not satisfied. Since the formulation does not seem amenable to be decomposed in a Lagrangian fashion, it is reformulated with a new set of variables. The resulting formulation is then given a more convenient graph theoretical interpretation, allowing it to be easily decomposed in a Lagrangian fashion. In doing so, a Non Delayed Relax-and-Cut (NDRC) algorithm is then applied. In association, an effective new rule for discarding inactive dualized inequalities is also proposed and tested here. Additionally, operating under the proposed NDRC framework, a Lagrangian heuristic is implemented to find PCSPG feasible solutions. One of the features of this heuristic is the use of Lagrangian dual information to generate feasible integral solutions to PCSPG. It also uses Local Search to attempt to improve the feasible solutions thus obtained. These combined ingredients are repeatedly used throughout the Relax-and-Cut algorithm. Preprocessing and variable fixing tests, that proved effective in reducing instance input size, are also used in the NDRC algorithm.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, systems, and a computer-usable medium storing computer-readable instructions for configuring, designing, optimizing and installing a network. Components of the invention may be enabled as a modular framework and/or deployed as software as an application program tangibly embodied on a program storage device. The application code for execution can reside on a plurality of different types of computer readable media known to those skilled in the art. The instructions contained in the code may be executed by computer including a processor with interfaces for storing and retrieving data, displaying data to a human and receiving data from a human. Embodiments may be implemented using Linux, Unix, Apple, Windows or other computer Operating Systems (OSs).

An Integer Programming Formulation for PCSPG

The PCSPG formulation used in this application involves two different sets of variables. Namely, variables $\{y_i \in \{0,1\}: i \in V\}$ to select the vertices to appear in the Prize-Collecting Steiner (PCS) tree and variables $\{x_e \geq 0: e \in E\}$ to connect these vertices. Denoted by $E(S) \subset E$, the set of edges with both endpoints in $S \subset V$. Accordingly, $x(E(S)) := \Sigma_{e \in E(S)} x_e$ represents the sum of the variables associated with the edges in $E(S)$. Likewise, $y(S) := \Sigma_{i \in S} y_i$ represents the sum of the variables associated with the vertices in $S$. Using this notation, a PCSPG formulation from the literature is then given by $$\min\left\{\sum_{e \in E} c_e x_e + \sum_{v \in V} d_v(1-y_v): (x,y) \in \mathcal{R}_0 \cap (\mathbb{R}_+^{|E|}, \mathbb{B}^{|V|})\right\}, \quad (1)$$

where $\mathbb{B}^{|V|}$ stands for $\{0,1\}^{|V|}$ and the polyhedral region $\mathcal{R}_0$ is defined as $$x(E) = y(V) - 1, \quad (2)$$

$$x(E(S)) \leq y(S \setminus \{j\}), \forall j \in S, \forall S \subseteq V, \quad (3)$$

$$0 \leq x_e \leq 1, \forall e \in E, \quad (4)$$

$$0 \leq y_i \leq 1, \forall i \in V. \quad (5)$$

For the formulation above, for any feasible solution, constraint (2) imposes that the number of edges involved must equal the number of vertices minus one, very much as one would expect from a PCS tree. Constraints (3) generalize the Subtour Elimination Constraints (SECs) from the literature and guarantee that the resulting solution is cycle free. Finally, inequalities (4) and (5) define valid lower and upper bounds for the variables involved. Thus, after introducing necessary integrality constraints on the y variables, it then follows that the set of feasible solutions to (1) imply all PCS trees of G.

Clearly, single vertex solutions to PCSPG could be efficiently computed through explicit enumeration. Bearing that in mind, recent work has concentrated on feasible PCSPG solutions involving one or more edges. Such a restricted version of the problem follows from (1) and is given by $$\min\left\{\sum_{e\in E}c_e x_e + \sum_{v\in V}d_v(1-y_v): (x,y) \in \mathcal{R}_1 \cap (\mathbb{R}_+^{|E|}, \mathbb{B}^{|V|})\right\}, \quad (6)$$

where polyhedral region $\mathcal{R}_1$ is defined by the set of constraints in $\mathcal{R}_0$ plus $$x(\delta(i)) \geq y_i, \forall i \in V \text{ with } d_i > 0, \text{ and} \quad (7)$$

$$x(\delta(i)) \geq 2y_i, \forall i \in V \text{ with } d_i = 0. \quad (8)$$

Indeed, to exclude single vertex solutions from (1), it suffices to append inequalities $$x(\delta(i)) \geq y_i, \forall i \in V \quad (9)$$

to (1). However, given the nonnegative edge costs and vertex penalties in PCSPG, the stronger inequalities (7) are used, for positive penalty vertices. It should be noticed that (8) explicitly imposes that no zero penalty vertex may be a leaf in an optimal PCS tree. Validity of this condition follows from the fact that a PCS tree of lower weight would otherwise be obtained after eliminating leaves for zero valued penalty vertices (thus contradicting any optimality assumption).

Exchanging variables and uncovering structure: Typically, for the use of Lagrangian relaxation, one looks for an easy to solve problem, obtained after dropping a set of complicating constraints from the formulation in hand. Ideally, such a problem should be capable of returning, for the specific application, a good quality bound on (6). In principle, $\mathcal{R}_1$ does not appear to contain a structure meeting these requirements. However, as shall be shown next, such a structure is actually hidden in $\mathcal{R}_1$ and could be uncovered by following a two-step procedure. Firstly, binary 0-1 variables $\{y_i: i \in V\}$ should be replaced by their complements in 1. Then, the new variables should be re-interpreted in terms of a graph which expands $G=(V, E)$ with the introduction of an artificial vertex together with some edges incident to that vertex.

To implement the first of the two steps indicated above, let $\{z_i=1-y_i: i \in V\}$ be the set of variables to replace $\{y_i: i \in V\}$ in (6). Exchanging variables results in a polyhedral region $\mathcal{R}_2$ in a one-to-one correspondence with $\mathcal{R}_1$, given by $$x(E) + z(V) = |V| - 1, \quad (10)$$

$$x(\delta(i)) + z_i \geq 1, \forall i \in V \text{ with } d_i > 0, \quad (11)$$

$$x(\delta(i)) + 2z_i \geq 2, \forall i \in V \text{ with } d_i = 0, \quad (12)$$

$$x(E(S)) + z(S\setminus\{j\}) \leq |S| - 1, \forall j \in S, \forall S \subseteq V, \quad (13)$$

$$0 \leq x_e \leq 1, \forall e \in E, \text{ and} \quad (14)$$

$$0 \leq z_i \leq 1, \forall i \in V. \quad (15)$$

Re-written as above, Generalized Subtour Elimination Constraints (GSECs) (13) now appear very clearly as a lifting of ordinary SECs. A reformulation of (6) is thus given by $$\min\left\{\sum_{e\in E}c_e x_e + \sum_{i\in V}d_i z_i: (x,y) \in \mathcal{R}_2 \cap (\mathbb{R}_+^{|E|}, \mathbb{B}^{|V|})\right\}. \quad (16)$$

At this point, an alternative interpretation to the meaning of variables $\{z_i: i \in V\}$ can be given. Assume that an artificial vertex (n+1), where n=|V|, has been introduced into G=(V, E) and that every variable $z_i$, $i \in V$, represents an edge of cost $d_i$ directly linking i to (n+1). Denoting by G'=(V', E') the graph or network that results from this expansion of G, then $V'=V\cup\{n+1\}$ and $E'=E\cup\{(i,n+1): i \in V\}$.

Notice that |V'|−2 (or, alternatively, |V|−1) edges of G' must appear at any feasible solution to (10)-(15). Notice as well that such a solution must violate no GSECs. It is thus not difficult to check that any feasible solution to (10)-(15) corresponds to a certain GSEC restricted spanning forest of G' with exactly two connected components. As shown in FIG. 1, one of these components 110 must either be a star centered at vertex (n+1), (i.e., a set of one or more edges of G', all incident to vertex (n+1)) or else vertex (n+1) in isolation. GSECs $x_e+z_i \leq 1$ and $x_e+z_j \leq 1$, defined for a set $S=\{i,j\} \in V$, where $e=(i,j) \in E$, imply the topology of the first component. Also shown in FIG. 1, the other component 120 must be a PCS tree involving at least one edge of G and having no vertex $i \in V$ with $d_i=0$, as a leaf (as enforced by inequalities (11) and (12)).

Within a Lagrangian framework, the remarks above provide us with an attractive structure to work with: an unrestricted spanning forest of G' with exactly |V'|−2 edges. Provided such a spanning forest does not violate degree constraints (11) and (12) nor GSECs (13), it must imply a feasible PCSPG solution involving two or more edges. In accordance with that, consider now a polyhedral region $\mathcal{R}_3$ given by $$x(E) + z(V) = |V'| - 2 \quad (17)$$

$$x(E(S)) \leq (S) - 1, \forall S \subseteq V' \quad (18)$$

$$0 \leq x_e \leq 1, \forall e \in E \quad (19)$$

$$0 \leq z_i \leq 1, \forall i \in V \quad (20)$$

where (18) are ordinary SECs. A forest of G' with exactly |V'|−2 edges must then be associated with any point in $\mathcal{R}_3$ where $z \in \mathbb{B}^{|V|}$. Additionally, if such a point does not violate (11), (12) and (13), it must imply a PCS tree, i.e., the second of the two structures, structure 120 of FIG. 1. Therefore, if one attaches nonnegative multipliers to inequalities (11), (12) and (13) and brings them to the objective function in (16), optimizing the resulting Lagrangian modified objective function over $(x,y) \in \mathcal{R}_3 \cap (\mathbb{R}_+^{|E|}, \mathbb{B}^{|V|})$ returns a valid PCSPG lower bound.

Figure 4A:
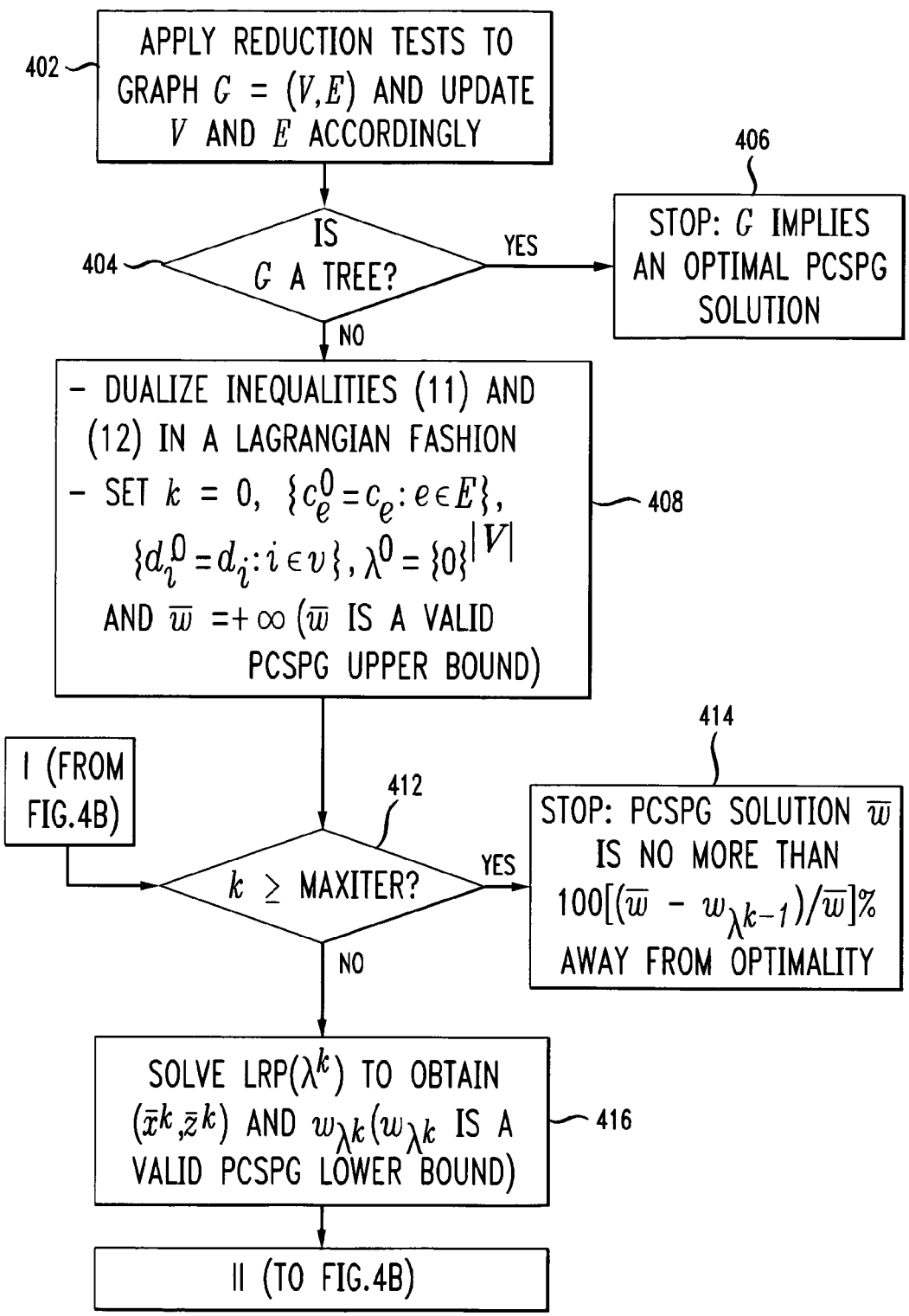

A method in accordance with one embodiment of the invention is represented by the flowchart of FIGS. 4A and 4B. As elements of that method are discussed in the disclosure below, reference is made to the corresponding element numbers in the figure.

The inequalities (11), (12) are dualized (step 408 of FIG. 4A) in a Lagrangian fashion and values are initialized before the start of the iterations performed in the method of the invention. The iterative process of the invention may continue for a predetermined number of iterations (decision block 412) wherein a PCSPG solution $\bar{w}$ is found that is no more than $$100[(\bar{w} - w_{\chi k-1})/\bar{w}]$$

percent away from optimality (step 414). Alternatively, the iterations may cease when the upper and lower bounds are within a predetermined distance, or after the iteration has run a predetermined amount of time Since exponentially many inequalities exist in (13), dualizing them in a Lagrangian fashion is not as straightforward as it would otherwise be for (11) and (12). Thus, in the following section, a description is given of NDRC algorithms. As mentioned before, NDRC allows one to deal with the nonstandard Lagrangian relaxation application suggested above.

Non Delayed Relax and Cut (NDRC)

The NDRC algorithm used in the methods of the present invention is based upon the use of a Subgradient Method (SM) known in the art to be used to describe and test NDRC. It is assumed that a formulation for a NP-hard combinatorial optimization problem is given. It is further assumed that exponentially many inequalities are involved in it. Such a formulation is generically described as:

$$w=\min\{cx: Ax \leq b, x \in X\}, \quad (21)$$

where, for simplicity, x denotes binary 0-1 variables, i.e., $x \in B^p$ for an integral valued p>0. Accordingly, for an integral valued m>0, results in $c \in R^p$, $b \in R^m$, $A \in R^{m \times p}$ and $X \subset B^p$. Assume, as it is customary for Lagrangian relaxation, that $$\min\{cx: x \in X\}, \quad (22)$$

is an easy to solve problem. On the other hand, in what is unusual for the application of Lagrangian relaxation, assume that m is an exponential function of p; i.e., (21) contains exponentially many inequalities. Assume as well that one dualizes $$\{a_i x \leq b_i: i=1, 2, \ldots, m\} \quad (23)$$

in a Lagrangian fashion, regardless of the difficulties associated with the dualization of exponentially many inequalities. Denote by $\lambda \in R_+^m$ the corresponding vector of Lagrangian multipliers. A valid lower bound on (21) is thus obtained (step 416 of FIG. 4A) by solving the Lagrangian Relaxation Problem (LRP($\lambda$))

$$w_\lambda = \min\{(c+\lambda A)x - \lambda b: x \in X\}. \quad (24)$$

To attain the best possible Lagrangian bound (24), Subgradient Method (SM) could be used to solve the corresponding Lagrangian Dual Problem (LDP)

$$w_d = \max_{\lambda \in R_+^m} \{w_\lambda\}. \quad (25)$$

Optimization is typically conducted here in an interactive way with multipliers being updated so that $w_d$ is obtained. The following is a description of a subgradient method as implemented in the method of the invention. That implementation is precisely the one adapted in this application to produce the computational results in the section below entitled, "Computational Experiments," wherein the NDRC algorithm is tested.

A brief description of the Subgradient Method. At iteration k of SM, for a feasible vector $\lambda^k$ of Lagrangian multipliers, let $\bar{x}^k$ be an optimal solution to LRP($\lambda^k$), with value $w_{\lambda^k}$, and $\bar{w}$ be a known upper bound on (21). Additionally, let $g^k \in R^m$ be a subgradient associated with the relaxed constraints at $\bar{x}$. Corresponding entries for $g^k$ are $$g_i^k = (b_i - a_i \bar{x}^k), i=1, 2, \ldots, m. \quad (26)$$

In the literature, to update Lagrangian multipliers, one initially generates a step size:

$$\theta^k = \frac{\alpha[\bar{w} - w_{\lambda^k}]}{\sum_{i=1,\ldots,m} (g_i^k)^2}, \quad (27)$$

where $\bar{w}$ is a valid upper bound on w and $\alpha$ is a real number assuming values in (0,2]. Having done that, one then updates multipliers as $$\lambda_i^{k+1} = \max\{0; \lambda_i^k - \theta^k g_i^k\}, i=1, \ldots, m \quad (28)$$

and moves on to iteration k+1 of SM.

Under the conditions imposed here, the straightforward use of updating formulas (27)-(28) is not as simple as it might appear. The reason is the exceedingly large number of inequalities that one would typically have to deal with.

NDRC modifications to the Subgradient Method: Inequalities in (23), at iteration k of SM, may be classified into three sets. The first contains inequalities that are violated at $\bar{x}^k$. The second is for those inequalities that have nonzero multipliers currently associated with them. Notice that an inequality may simultaneously be in the two sets just defined. Finally, the third set contains the remaining inequalities. As is conventional, three sets of inequalities just described, respectively, will be referred to as the Currently Violated Active set, the Previously Violated Active set, and the Currently Inactive set. Accordingly, they are respectively denoted by CA(k), PA (k) and CI(k).

In J. E. Beasley, "Lagrangean Relaxation", Modern Heuristic Techniques, Collin Reeves, editor, Blackwell Scientific Press, Oxford, 1993, it is reported that, for the traditional use of Lagrangian relaxation, say when m is a polynomial function of p, there is good practical convergence of SM, while arbitrarily setting $g_i^k = 0$ whenever $g_i^k > 0$ and $\lambda_i^k = 0$, for $i \in \{1, \ldots, m\}$. In that context, all subgradient entries that are candidates to that modification belong to CI(k).

In spite of the exponentially many inequalities one is faced with, Beasley's advice is followed. The reasoning for doing that comes from two observations. The first one is that, irrespective of the suggested changes, from (28), multipliers for CI(k) inequalities would not change their present null values at the end of the current SM iteration. As such, at the current SM iteration, clearly, CI(k) inequalities would not directly contribute to Lagrangian costs. On the other hand, they would play a decisive role in determining the value of $\theta^k$ and this fact brings us to the second observation. Typically, for the application being described, the number of strictly positive subgradient entries associated with CI(k) inequalities, tends to be huge. If they are all explicitly used in (27), $\theta^k$ would be extremely small, leaving multiplier values virtually unchanged from iteration to iteration and SM convergence problems should be expected.

By following Beasley's suggestion, an exceedingly large number of inequalities in CI(k) can be dealt with in a SM framework. However, the problems arising from a potentially large number of inequalities in (CA(k)\PA(k)) must be dealt with. These, as one may recall, are the inequalities that will become effectively dualized; i.e., they will have a nonzero multiplier associated with them at the end of SM iteration k.

Assume now that a large number of inequalities exist in (CA(k)\PA(k)). These inequalities must therefore be violated at the solution to LRP($\lambda^k$) and have zero valued Lagrangian multipliers currently associated with them. Typically, such inequalities may be partitioned into subsets associated, for instance, with a partitioning of the set of vertices in a given associated graph, if that applies. Then, according to some associated criteria, a maximal inequality would exist for each of these subsets. In order to avoid repeatedly penalizing the same variables, again and again, only one maximal inequality per subset of inequalities is dualized. Excluding these inequalities, remaining inequalities in (CA(k)\PA(k)) will have their subgradient entries arbitrarily set to 0, thus becoming, in effect, CI(k) inequalities.

One should notice that, under the classification proposed above, inequalities may change groups from one SM iteration to another. It should also be noticed that the only multipliers that will have directly contributed to Lagrangian costs $(c+\lambda^{K+1}A)$, at the end of SM iteration k, are the ones associated with active inequalities; i.e., inequalities in (CA(k)\PA(k)).

An important step in the dynamic scheme outlined above is the identification of inequalities violated at $\bar{x}^k$. This problem must be solved at every iteration of SM and is equivalent to the separation problems found in Branch-and-Cut algorithms. However, NDRC separation problems typically involve lower complexity algorithms than their Branch-and-Cut counterparts. This follows from the fact that LRP($\lambda$) is normally formulated so that separation is conducted over integral structures.

Extending the life of dynamically dualized inequalities: For the NDRC algorithm outlined above, assume that a given inequality is dynamically dualized at iteration k of SM. Accordingly, assume, as previously suggested, that this inequality is dropped from updating formula (27) as soon as it becomes inactive. This would specifically occur at the very first SM iteration $k_1>k$ for which, simultaneously, the inequality is not violated at the solution $\bar{x}^{k_1}$ to LRP($\lambda^{k_1}$) and its corresponding Lagrangian multiplier drops to zero.

For the computational experiments in this study, an alternative to the rule above is tested. Namely, extending the life or, better say, the use of a dualized inactive inequality in updating formula (27), past iteration $k_1$. Accordingly, denote the age of a dynamically dualized inequality, the number of consecutive SM iterations past $k_1$ where the inequality is not violated by corresponding LRP($\lambda^k$) solutions. Under this new rule, such an inequality remains dualized and is allowed to be used in (27) for as long as its age is less than a given parameter EXTRA$\geq$1. Clearly, in doing so, whenever an inequality aged over 1 is violated at a LRP($\lambda^{k_2}$) solution $\bar{x}^{k_2}$, where $(k_2-k_1)\leq$EXTRA, the inequality will leave probation and enter set CA($k_2$). As a result, no need would exist, for the time being, to keep track of it. Obviously, this and monitoring of it becomes, once more, mandatory.

The use of the alternative rule proposed above proved quite effective. In fact, for some of the instances tested, gaps between NDRC upper and lower bounds were closed by as much as 30%, after setting EXTRA to a value larger than 1.

NDRC Bounds to PCSPG

An NDRC algorithm to PCSPG is implemented where GSECs (13) are dynamically dualized, as suggested in the previous section. Degree-inequalities (11) and (12), however, which are small in number, were dualized in a traditional Lagrangian fashion. Thus, these inequalities remain dualized throughout SM, irrespective of being active or not.

At iteration k of SM, for a conformable value q>0, assume that Lagrangian multipliers $\lambda^k \in R_+^q$ are associated with the dualized inequalities. Following the previous discussion, a valid lower bound on (16) is thus given by the solution to LRP($\lambda^k$), formulated as $$\min\left\{\sum_{e \in E} c_e^k x_e + \sum_{i \in V} d_i^k z_i + const(\lambda^k) : (x, z) \in \mathcal{R}_3 \cap (Z^{|E|}, \mathbb{B}^{|V|})\right\}, \quad (29)$$

where $\{c_e^k: e \in E\}$ and $\{d_i^k: i \in V\}$ are respectively Lagrangian modified edge costs and vertex penalties and const($\lambda^k$) is a constant implied by $\lambda^k$.

Notice that an optimal solution to (29); i.e., a minimum cost forest of G' with exactly (|V'|−2) edges, is easy to obtain. To do so, among the alternatives available, to stop immediately after the first (|V'|−2) edges are selected.

Figure 2:
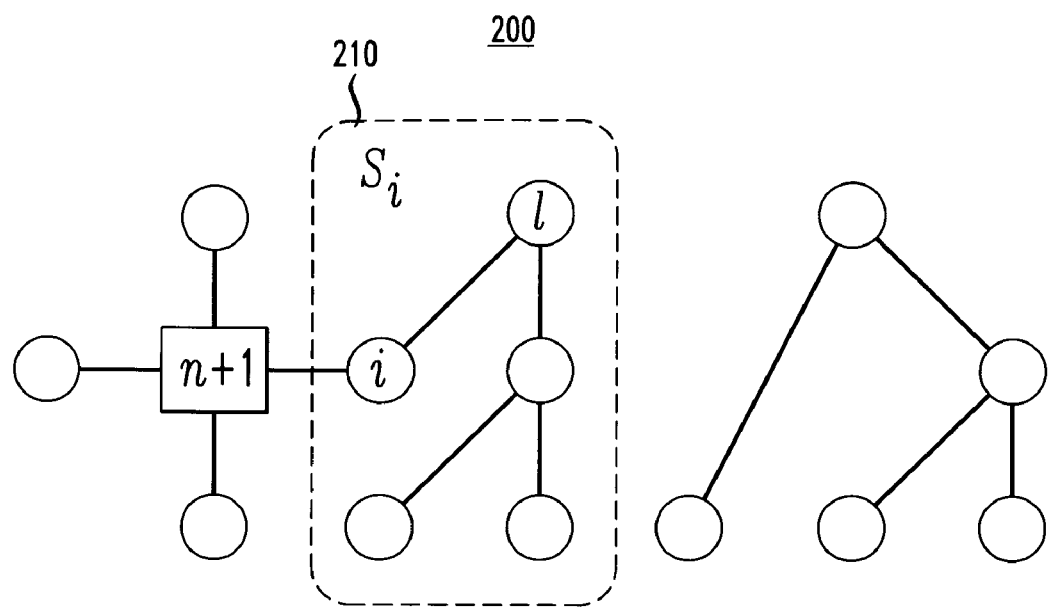
FIG. 2 illustrates an infeasible $(\bar{x}^k, \bar{z}^k)$ solution.

Let us now concentrate on solutions $(\bar{x}^k, \bar{z}^k)$ to LRP($\lambda^k$), which are infeasible to PCSPG. Each of these solutions gives rise to a support graph, that is a subgraph of G' induced by the nonzero entries in $(\bar{x}^k, \bar{z}^k)$. A typical support graph 200 is depicted in FIG. 2. From the previous discussion, it is clear that feasible solutions to (29) that happen to be feasible to (16) as well, must either contain vertex (n+1) appearing in isolation or else have that vertex as the center of a star, as previously defined. For the solution in FIG. 2, vertex i$\in$V contains two edges incident to it, namely (i, n+1) and (i,l). Thus, that solution must be infeasible to PCSPG and, as such, must imply violated GSECs. Examples of such inequalities are the four maximal GSECs induced by the set 210 of five encircled vertices shown in FIG. 2. For each of these inequalities, in turn, a different vertex j$\in$S\{i} is singled out in (13).

For a given optimal LRP($\lambda^k$) solution $(\bar{x}^k, \bar{z}^k)$, the identification of maximal violated GSECs could be carried out efficiently. This is attained by investigating the support graph associated with $(\bar{x}^k, \bar{z}^k)$. In doing so, assume that edge (i, n+1), for i$\in$V, is contained in that graph. In addition, denote by $S_i$ the set of support graph vertices, i itself included, that could be reached from i without crossing edge (i, n+1). Whenever $|S_i|$ is larger or equal to 2, violated GSECs must necessarily be associated with $S_i$. Vertices in $S_i$ 210 could be identified in O(n) time. To do so it suffices to eliminate (i, n+1) from the support graph and conveniently adapt any available shortest path algorithm to enumerate all vertices reachable from i.

After some computational experiments, it proved advantageous to dualize, in a traditional Lagrangian fashion, in addition to (11) and (12), all GSECs with |S|=2 (step 426, FIG. 4B). Only 2|E| such inequalities exist and, among all GSECs available, they are the ones that contribute the most to the Lagrangian bound. Apart from these simple GSECs, only maximal GSECs associated with sets $S_i$ of cardinality larger than 2 are dualized. Furthermore, from the experiments, for $S_i$ as just described, it proved advantageous to only dualize one out of the $|S_i|-1$ corresponding maximal violated GSECs. The inequality in (13) is thus dualized for which S=$S_i$ and vertex j$\in S_i$ is chosen as j=arg{$\max_{l \in (S\setminus\{j\})}\{d_l^k\}$}. Ties are broken arbitrarily. Once those inequalities are dualized, the Lagrangian multipliers $\lambda$ are updated (step 428, FIG. 4B) and the next iteration is initiated (step 412, FIG. 4A).

PCSPG upper bounds: Upper bounding strategy attempts to use Lagrangian dual information in a procedure to generate feasible integral solutions to PCSPG. The basic motivation behind this approach is the intuitive idea, validated by primal-dual algorithms, that dual solutions (respectively Lagrangian dual solutions, for this application) must carry relevant information for generating good quality primal solutions. Operating within a Lagrangian relaxation framework, the implementation of this basic idea involves two main components. The first is an algorithm based on the variant of GWA proposed in M. Minkoff, The Price Collecting Steiner Tree Problem, Master's theses, Department of Electrical Engineering and Computer Science, Massachusetts Institute of Technology, 2000. For reference herein, it will be called the Minkoff Algorithm (MA). The second is a Local Search (LS) procedure that attempts to improve feasible PCSPG solutions returned by MA.

GWA and MA are primal-dual based factor-of-2 approximation schemes for PC-SPG. They both rely on a constructive algorithm (where a forest of G is greedily built) followed by pruning (where one attempts to construct a PCS tree from the available forest components). One difference between GWA and MA is that, for the former, a given pre-specified root vertex r∈V must be passed as an input data to the constructive algorithm. Furthermore, only that connected component containing r may be subjected to pruning in GWA. As a result, |V| runs are required for GWA to attain a factor-of-2 approximation. Contrary to that, the constructive phase in MA, called UnrootedGrowthPhase, involves no root vertex. Additionally, all connected components resulting from it may be submitted to pruning. Due to these features, MA has a better run time complexity than GWA; i.e., $O(n^2 \log(n))$ versus $O(n^3 \log(n))$. Furthermore, the pruning algorithm used in MA, called BestSubTree, is based on Dynamic Programming and dominates the corresponding algorithm in GW (BestSubTree returns the best possible PCS tree for the subgraph of G induced by the connected component under inspection).

Due to the advantages discussed above, MA was selected to be used within the NDRC framework. Essentially, at an iteration k of SM, complementary costs $\{(1-\bar{x}_e^k)c_e: e\in E\}$ and complementary penalties $\{\bar{z}_i^k d_i: i\in V\}$ are computed and used as input data to UnrootedGrowthPhase, instead of the original edge costs and vertex penalties. That is shown in step 422 of FIG. 4B. That computation makes it more attractive for MA to select as many edges in the support graph of $(\bar{x}^k,\bar{z}^k)$ as possible. Accordingly, dual information is used to guide the construction of primal feasible solutions. This overall Lagrangian heuristic, MA included, is only run for SM iterations where $w_{2^k}$ improves upon the best Lagrangian relaxation bound previously generated at SM, as reflected by decision 418 of FIG. 4B. If not, the process is terminated and the solution $(\bar{x}^k, \bar{y}^k)$ is considered at least near-optimal (step 420). For every such iterative run, pruning algorithm BestSubTree is then used under the original edge costs and vertex penalties (instead of using corresponding complementary costs and penalties, as for the constructive algorithm). Solutions thus obtained are then subject to Local Search, which is discussed next.

Local search: Given a PCS tree $\mathcal{T}=(V_{\mathcal{T}},E_{\mathcal{T}})$, the primary interest is in comparing $\mathcal{T}$ with PCS trees that result from $\mathcal{T}$ after a single vertex inclusion or vertex exclusion operation. For the first operation, say the inclusion of vertex i∈V into $\mathcal{T}$, the most effective procedure to accomplish that task may involve the insertion into $\mathcal{T}$ of some additional vertices. Accordingly, the same applies for the operation of excluding a vertex $j\in V_{\mathcal{T}}$ from $\mathcal{T}$. The search neighborhood aimed for is thus formed by those PCS trees that result from an optimized inclusion (resp. exclusion) of a vertex into (resp. from) $\mathcal{T}$.

On implementing the Local Search (LS) procedure suggested above, a vertex inclusion (resp. exclusion) move is conducted in two steps. First, a minimal cost tree spanning the enlarged (resp. contracted) vertex set is computed. Then, at a second step, BestSubTree is applied to the resulting PCS tree. Only after this second step is carried out, one may evaluate potential vertex inclusion (resp. exclusion) benefits. Another key feature of the LS procedure is the effort to keep run time low and allow LS to be applied whenever MA is used. In order to do so, several dominance tests are performed to hopefully avoid having to evaluate every possible non-profitable move. The time required by the overall scheme is bounded from above by the time to compute, from scratch, a Minimum Spanning Tree (MST) of G; i.e., $O(m \log(n))$. To avoid paying that price, the dominance tests used are implemented as described in the SPG Tabu Search heuristic of C. C. Ribeiro and M. C. de Souza, "Tabu Search for the Steiner Problem in Graphs", *Network,* 36(2): 138-146, 2000. As shall be seen next, those tests could be easily adapted to PCSPG.

Dominance tests: Given a PCS tree $\mathcal{T}$, consider all different PCS subtrees contained in it. Clearly, the weight of each of these subtrees may differ from that of $\mathcal{T}$. Throughout the upper bounding algorithm, however, it will be enforced that no PCS tree $\mathcal{T}$ contains a subtree with a lower weight. This is called the Optimality Condition (OC) for $\mathcal{T}$ over the graph induced by $\mathcal{T}$ itself. As such, if $\mathcal{T}$ is passed to BestSubTree as an input, $\mathcal{T}$ itself must be returned as an output.

Dominance tests for insertion moves will be discussed first. Consider a vertex $i\notin V_{\mathcal{T}}$ and the set of edges connecting i to $V_{\mathcal{T}}$; i.e., $\delta_{\mathcal{T}}(i):=\{e\in E: e\in\delta(i)\cap\delta(V_{\mathcal{T}})\}$. Assume that the edges in $\delta_{\mathcal{T}}(i)$, i.e.

$$\{e_1, e_2, \ldots, e_{|\delta_{\mathcal{T}}(i)|}\},$$

are ordered in nondecreasing value of their edge costs. The following tests are then used to evaluate the benefits of inserting vertex i∈V into $\mathcal{T}$:

(1) If $|\delta_{\mathcal{T}}(i)|=0$, no PCS tree exists spanning $V_{\mathcal{T}}\cup\{i\}$.

(2) If $|\delta_{\mathcal{T}}(i)|=1$, inserting i into $\mathcal{T}$ is profitable if $d_e > c_{e_1}$. In this case, since the original tree satisfies OC, the new one must also satisfy that condition.

(3) If $|\delta_{\mathcal{T}}(i)|=2$, two cases must be considered:

(a) If $d_e > c_{e_1}$, inserting i into $\mathcal{T}$ is profitable and the resulting tree satisfies OC.

Figure 3:
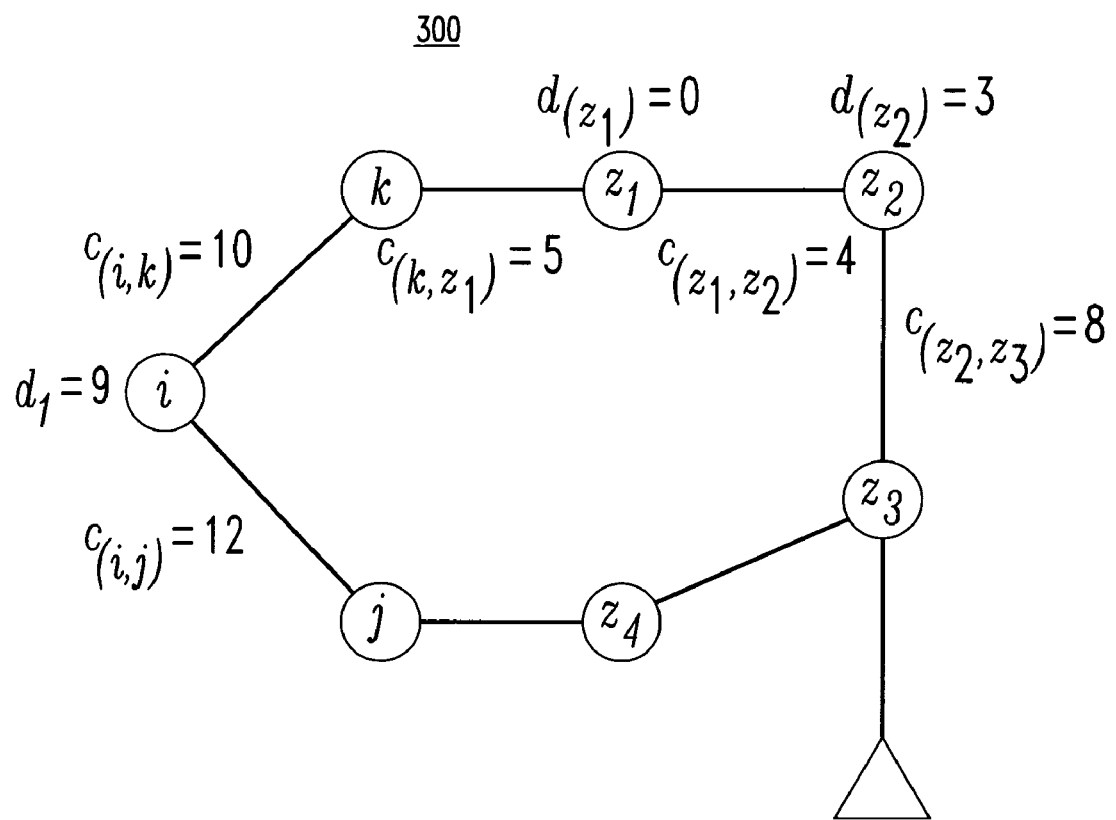
FIG. 3 shows an example of a cost improving key-path involving more than one edge.

(b) If $d_e \leq c_{e_1}$, inserting i into $\mathcal{T}$ might still be profitable. To see why, two examples are investigated. In the first one, assume that $e_1=(i,k)$, $e_2=(i,j)$ and that f is the maximum cost edge in the unique path in $\mathcal{T}$ connecting k and j. It is clear that whenever $d_i + c_f - c_{e_1} - c_{e_2} > 0$, the insertion of i is profitable. Now, look at the tree $\mathcal{T}$ 300 in FIG. 3. Note that if the path $P=\{(k,z_1), (z_1,z_2), (z_2,z_3)\}$ is removed, (as well as all its internal vertices) and edges (i,k) and (i,j) are added to $\mathcal{T}$, the resulting structure is a cost improving tree. Both the edge f in the first example and the path P in the second as a key-path between j and k. More precisely, a key-path between two vertices j and k in a tree $\mathcal{T}$ is either an edge in the unique path connecting them, or else, any subpath between k and j such that all its internal vertices have degree two. Now the net weight of a key-path as the sum of its edges costs minus the sum of the penalties for its internal vertices is defined. For example, the net weight of P in FIG. 3 is $w(P) = c_{(k,z_1)} + c_{(z_1,z_2)} + c_{(z_2,z_3)} - d_{z_2} = 14$. Thus, when evaluating the inclusion of i, a maximal-weight key-path $\mathcal{P}^*$ between j and k is found and a check preformed as to whether $\mathcal{P}^*$ is profitable; i.e., $d_i+(w\mathcal{P}^*)-c_{e_1}-c_{e_2}>0$. In positive case, as the current PCS tree satisfies OC, the tree obtained after removing $\mathcal{P}^*$ and including $e_1$, $e_2$ also does. Thus, the new (cost-improving) tree replaces the previous one and the search goes on. To find a maximal weight key-path, a Dynamic Programming procedure that runs at $O(|V_\mathcal{T}|)$ time is implemented.

(4) If $|\delta_\mathcal{T}(i)|\geq 3$, one should first introduce edge $e_1=(i,k)$ into $\mathcal{T}$. Denote by $\mathcal{T}_i$ the resulting PCS tree. In the sequel, one should add another edge $e_p=(i,j)\in \delta_\mathcal{T}(i)\setminus\{e_i\}$ into $\mathcal{T}_i$. Then one finds the largest cost edge f in the unique path of $\mathcal{T}_i$ connecting i and j and computes the gain $$d_i + c_f - c_{e_1} - c_{e_p}.$$

After evaluating, in turn, the gain provided by the inclusion in $\mathcal{T}_i$ of every edge $$e_p \in \{e_2, \ldots, e_{|\delta_\mathcal{T}(i)|}\},$$

as described above, the least cost PCS tree thus obtained should be submitted to BestSubTree, no matter if its gain is positive or not. Denote by $\mathcal{T}_{\delta(i)}$ the PCS tree thus obtained. Provided $\mathcal{T}_{\delta(i)}$ has less weight than $\mathcal{T}$, $\mathcal{T}_{\delta(i)}$ should then be relabeled $\mathcal{T}$.

The LS procedure is initiated with the insertion moves described above. In case they fail, exclusion moves, which are computationally more expensive, should then be attempted. However, prior to describing exclusion moves, some dominance tests associated with them will be described.

The analysis focuses on the exclusion of a Steiner vertex, say vertex j, from a Steiner tree $S=(V_S,E_S)$. In connection with that, assume that are the $k\geq 1$ edges of S incident to j. Accordingly, if vertex j is removed from S, k trees denoted by $\{S_l: l=1, \ldots k\}$ would result. Let $i_l,i_v$ be any pair of adjacent vertices to j in the current Steiner tree. Assume that j is indeed removed from S and define (p,q) as the minimum weight edge among all those connecting $S_l$ to the other k−2 trees $S_t: t\neq l$, as defined above. It has been proved in the literature that $\eta(j):=c_{(p,q)}-c_{(i_l,j)}-c_{(i_v,j)}$ gives a lower bound on the additional cost of a Steiner tree obtained after eliminating vertex j from S. Clearly, whenever $\eta(j)\geq 0$, the cost of such a Steiner tree is larger than that of S.

It is quite straightforward to adapt the result above to PCSPG. To that end, consider a PCS tree $\mathcal{T}$, a vertex $j\in V_\mathcal{T}$, and the corresponding associated trees $\{\mathcal{T}_l: l=1, \ldots k\}$, obtained after eliminating j from $\mathcal{T}$. Additionally, redefine $\eta(j)$ as $c_{(p,q)}-c_{(i_l,j)}-c_{(i_v,j)}+d_j$, where, once again, vertices $i_l$ and $i_v$ are any two adjacent vertices to j in $\mathcal{T}$ and (p,q) is the least cost edge connecting $\mathcal{T}_l$ to the other k−2 trees $\mathcal{T}_t: t\neq l$. In doing so, $\eta(j)$ now gives a lower bound on the additional weight of a PCS tree obtained after eliminating vertex j from $\mathcal{T}$. Based on the arguments above, prior to embarking on an analysis to attempt to exclude vertex j from $\mathcal{T}$, one should first determine $\eta(j)$. To do that, $i_v$ must be chosen as the immediate predecessor of j in the path of $\mathcal{T}$ that links j to the root of that tree. Likewise, $i_l$ is taken as the end vertex, other than $i_v$, of the maximum cost edge of $\mathcal{T}$ incident to j.

Reduction Tests and the Pricing Out of Suboptimal Variables

Prior to using the PCSPG NDRC lower and upper bound procedures in the previous section (NDRC Bounds to PCSPG), a few tests are applied to reduce problem input size. Additionally, throughout SM, tests which attempt to price out suboptimal edges are also used. Details of these two different types of tests are presented next.

Reduction tests: A reduction test for PCSPG, reflected in FIG. 4A as step 402, attempts to find vertices and edges of G that are guaranteed not to be in any optimal solution to the problem. If G is found to be a tree after applying the reduction tests (decision 404), then no further action is taken in the overall method (step 406) because if G is a tree then it is implied that there is already an optimal PCSPG solution. The tests that follow were adapted from SPG reduction tests.

Shortest path test. The test is only applied if $c_e>0$ for all $e\in E$. Let dist(i,j) be the length of the shortest path linking vertices i and j, for i, $j\in V$. If dist(i,j)$<c_e$, where $e=(i,j)\in E$, then edge e is suboptimal and could be eliminated from G.

Cardinality-one test. Assume that a given vertex, say vertex $i\in V$, has an edge cardinality of one, i.e., $|\delta(i)|=1$. Denote by e the only edge incident to i. If $c_e>d_i$, then vertex i and, consequently, edge e are suboptimal and could be eliminated from G.

Cardinality-two test. Assume that the edge cardinality of $i\in V$ equals two and denote respectively by $e_1=(i,i_1)$ and $e_2=(i,i_2)$ the two edges of G that are incident to i. If $c_{e_1}>0$, $c_{e_2}>0$ and $d_i=0$, either $e_1$ and $e_2$ must simultaneously appear at an optimal PCS tree or else neither of these edges may be part of such a tree. The reasoning behind this test, as explained before, follows from the sub-optimality of any PCS tree containing vertex i as a leaf. Recall, in that case, that the only edge incident to i may be eliminated from the tree and a lesser cost PCS tree would then result.

Provided the conditions set above are met, vertex i could be pseudo eliminated by replacing the two edges incident to it by a single edge $(i_1,i_2)$ of cost $c_{(i,i_1)}+c_{(i,i_2)}$. Whenever two edges $(i_1,i_2)$ result from this operation, only the edge with the least cost should be kept.

Cardinality-larger-than-two test. Provided certain conditions are met, pseudo elimination could also be extended to vertices with edge degrees larger than 2. Assume, for instance, that vertex $i\in V$ has $|\delta(i)|=3$, all edges incident to i are positive valued and $d_i=0$. Assume as well that it was somehow established that no optimal PCS tree exists with 3 edges incident to i. Therefore, under these conditions, either vertex i is part of no optimal PCS tree or else it appears at such a tree with an edge degree of 2 (recall that i could not have an edge degree of 1 at an optimal PCS tree). Vertex i could thus be pseudo eliminated by joining together into single edges each of the 3 possible combinations of two edges incident to i. Clearly, in doing so, no optimal PCS tree would be eliminated from the original solution space.

For a vertex $i\in V$ with edge degree $k\geq 4$, testing for pseudo elimination is considerably more demanding than the situation described above for k=3. For $k\geq 4$, pseudo elimination may only be carried out if it could be established that no optimal PCS tree exists containing exactly l edges incident to i, for $3 \leq l \leq k$. However, due to the combinatorial explosion implied by checking that condition, the test should be restricted, in practice, to vertices where k is not very large.

Following the outline suggested above, the test will be described. For convenience, it will be split in two cases. The first is for vertices $i \in V$ with edge degree $k=3$. The second is for those vertices $i \in V$ with $k \geq 4$. In either case, the cost of all edges incident to i must be non negative and $d_i = 0$.

Assume first that $|\delta(i)|=3$ and let $i_1$, $i_2$ and $i_3$ be the three vertices of G sharing an edge with i. Denote respectively by $e_1=(i,i_1)$ $e_2=(i,i_2)$ and $e_3=(i,i_3)$, these edges. Then, if $$\min\{\text{dist}(i_1,i_2)+\text{dist}(i_1,i_3), \text{dist}(i_2,i_1)+\text{dist}(i_2,i_3), \text{dist}(i_3,i_1)+\text{dist}(i_3,i_2)\} \leq c_{e_1}+c_{e_2}+c_{e_3}, \quad (30)$$

no optimal PCS tree exists involving 3 edges incident to i. As such, i could be pseudo eliminated from G. As explained before, that is accomplished by replacing every combination of two distinct edges incident to i by an associated, conveniently defined, single edge.

Let us now extend the test for vertices $i \in V$ with $|\delta(i)|=k$, where $k \geq 4$. To understand this generalization, one should notice that the left hand side of (30) equals the cost of the MST for the distance subgraph of G implied by vertices $i_1$, $i_2$ and $i_3$. Thus, in general terms, one should first compute a MST for the distance subgraph of G associated with the k vertices that share an edge with i. Having done that, one should then compare the cost of that MST against the sum of the costs for the k edges incident to i. In case the MST has the smallest cost, a guarantee is obtained that no optimal PCS tree exists involving exactly k edges incident to i. However, at that point, to allow i to be pseudo eliminated, a similar test must also be successful for every distinct combination involving l of the k edges incident to i, for $3 \leq l \leq (k-1)$.

Minimum adjacency test. Assume that an edge $(i,j) \in E$ exists linking two positive penalty vertices $i,j \in V$. If $\min\{d_i, d_j\} - c_{(i,j)} > 0$ and $c_{(i,j)} = \min\{c_{(i,u)}: (i,u) \in E\}$ then vertices i and j may be shrunk into a single vertex of penalty $d_i + d_j - c_{(i,j)}$. As a result of this shrinking, whenever edges $(i,v)$ and $(j,v)$ belong to E, two parallel edges linking v to the new vertex will result. These should then be merged into a single edge of cost $\min\{c_{(i,v)}, c_{(j,v)}\}$.

Net weight gain cardinality two path test. For three given vertices of V, say i, j, and k, assume that edges $(i,j)$, $(i,k)$ and $(j,k)$ belong to E. Assume as well that $c_{(i,k)} - c_{(j,k)} - d_k < c_{(i,j)}$ and $c_{(i,j)} \geq \min\{c_{(i,k)}, c_{(j,k)}\}$ apply. Then, in this Net Weight Gain Cardinality Two Path Test (NWGC2), edge $(i,j)$ must be suboptimal since the path formed by edges $(i,k)$ and $(j,k)$ offers an alternative to spanning vertices i and j through edge $(i,j)$, at a positive net weight gain of $(c_{(i,j)} - c_{(i,k)} - c_{(j,k)} + d_k)$. It should be noticed that the NWGC2 improves on the minimum distance test. That applies since NWGC2 may eventually succeed in proving that an edge $(i,j) \in E$ for which $\text{dist}(i,j) = c_{(i,j)}$, is suboptimal.

Variable fixing tests: As indicated before, feasible solutions to LRP($\lambda^k$), defined as suggested in the section covering NDRC Bounds to PCSPG, imply forests of G' with exactly $(|V|-2)$ edges. For this type of structure, LP reduced costs are quite straightforward to compute. Indeed, this task could be accomplished by performing some simple, conveniently defined, edge exchanges. These exchanges, in turn, directly follow from exchanges previously suggested for computing LP reduced costs for spanning trees.

For this particular application, assume that the k-th iteration of SM is being implemented and let $(\bar{x}^k, \bar{z}^k) \in B^{|E|+|V|}$ be an optimal solution to LRP($\lambda^k$), formulated at that iteration. Accordingly, the $|E|$ components in $\bar{x}^k$ are associated with the edges of E. Likewise, the $|V|$ components in $\bar{z}^k$ are associated with the edges $\{(n+1),i): i \in V\}$ of the expanded graph $G'=(V', E')$. As one may recall, edges $\{(n+1),i): i \in V\}$ are part of the reformulation and reinterpretation of PCSPG in terms of G'.

For $(\bar{x}^k, \bar{z}^k)$, as defined above, assume that $\bar{c}_e^k$, for $e=(i,j) \in E'$, is the corresponding LP reduced cost for the variables involved. Then, $\bar{c}_e^k$ is computed as $$\bar{c}_e^k = c_e^k - c_{e_0}^k, \quad (31)$$

where $e_0$ is an edge that is dependent on the forest topology that $(\bar{x}^k, \bar{z}^k)$ implies on G'. Assume first that i and j share a same component in that forest. Then a unique path must exist linking i and j in that component and $e_0$ should be taken as the largest Lagrangian edge cost for this path. Otherwise, if i and j appear in different components, $e_0$ should be taken as the largest overall Lagrangian cost for an edge in the solution forest.

Denote by $w_{\lambda^k}$ the value of solution $(\bar{x}^k, \bar{z}^k)$ to LRP($\lambda^k$) and by $\bar{w}$ a known valid PCSPG upper bound. Then, if $(\bar{c}_e^k + w_{\lambda^k}) > \bar{w}$, the variable associated with e is guaranteed not to appear at an optimal PCSPG solution. As such, that variable (respectively edge e) could thus be eliminated from the formulation (respectively from G') (step 424 of FIG. 4B). The Lagrangian variable fixing test just described has become standard in the literature.

Summary of the Method

An exemplary method in accordance with the invention is summarized in the flow diagram of FIGS. 4A & 4B. The method determines an optimal or near-optimal conveyance network, such as a fiber optic telecommunications network. The network includes a conveyance linking a service provider location with customer locations. The resulting network is determined from a number of potential customer locations located on a number of potential conveyance routes. Each potential customer location is associated with a potential customer revenue and each potential conveyance route is associated with a potential cost of the conveyance.

The network determined by the method is a network that yields a total profit within a predetermined bound of a maximum possible total revenue. The method iteratively maximizes total revenue by increasing customer revenue while decreasing costs associated with network installation and maintenance.

The optimization problem for the network is initially formulated as a prize-collecting Steiner tree problem in graphs (PCSPG) in the form of a graph G representing the network. The graph G includes potential conveyance routes $x_e$ between locations of potential customers as edges and locations of potential customers $y_i$ as vertices. The PCSPG also includes a plurality of generalized subtour elimination constraint (GSEC) inequalities.

Each $y_i$ representing a location of a potential customer, is replaced with a complement $z_i = 1 - y_i$. Reduction tests are applied (step 402) to the graph $G=(V,E)$ and V and E are updated accordingly. If the graph G is found to be a tree (decision 404), then the method is stopped (step 406) because that implies an optimal PCSPG solution.

If the graph G is found not to be a tree, then a subset of the GSEC inequalities is dualized (step 408) in a Lagrangian fashion. In a preferred embodiment, the inequalities (11) and (12) from the above discussion are dualized. An iterative process is then initialized by setting $k=0$, $\{c_e^0 = c_e: e \in E\}$, $\{d_i^0 = d_i: i \in v\}$, $\lambda^0 = \{0\}^{|V|}$ and $\bar{w} = +\infty$ (where $\bar{w}$ is a valid PCSPG upper bound).

The iterative process is then performed to carry out a subgradient method (SM) on a solution $(\bar{x}^k, \bar{z}^k)$ to determine a near-optimal or optimal solution to the PCSPG. The iterative process is limited by an iteration limitation criterion such as a maximum number of iterations or a maximum amount of time that the iteration will be permitted to run. In exemplary decision block 412, an iteration counter k is examined to determine whether loop count has reached or exceeded a limit MAXITER. If so, the iteration is stopped (step 414) and PCSPG solution w is no more than $$100[(\overline{w} - w_{\lambda^{k-1}})/\overline{w}]\%$$

away from optimality.

If the iteration limitation criterion has not been reached, LRP($\lambda^k$) is solved (step 416) to obtain ($\overline{x}^k,\overline{z}^k$) and $w_{\lambda^k}$ (where $w_{\lambda^k}$ is a valid PCSPG lower bound) by performing Lagrangian relaxation on a vector of multipliers $\lambda$ corresponding to the GSEC inequalities.

The upper and lower bounds are then compared to determine whether the iteration has reached an optimal solution. It is determined (decision 418) whether ($\overline{w}-w_{\lambda^k}$)<1, where $\overline{w}$ is a previously obtained valid upper bound. If so, the current ($\overline{x}^k, \overline{z}^k$) is determined (step 420) to be the network solution.

If an optimal solution has not yet been reached, a Lagrangian heuristic including a Minkoff algorithm is performed (step 422) on the solution ($\overline{x}^k,\overline{z}^k$) using complementary costs and penalties $\{(1-x_e^k)\cdot c_e: e\in E\}$ and $\{\overline{z}_i^k\cdot d_i: i\in V\}$ as input and using no root vertex as input. The heuristic may further include a pruning algorithm using original costs and penalties as input. The heuristic produces an upper bound replacing $\overline{w}$ if the upper bound is lower than $\overline{w}$.

A linear programming-based reduced cost test is then applied (step 424). The test is defined by the solution ($\overline{x}^k,\overline{z}^k$) to identify edges that are not in any optimal solution; those edges are eliminated from further consideration. The test may include computing a cost $\overline{c}_e^k$ of an edge e in the current iteration k where $\overline{c}_e^k = c_e^k - c_{e_0}^k$ where $e_0$ is an edge that is dependent on forest topology implied by ($\overline{x}^k,\overline{z}^k$). The edge e is eliminated if ($\overline{c}_e^k + w_{\lambda^k}) > \overline{w}$.

Those GSECs that violate the solution ($\overline{x}^k,\overline{z}^k$) are next identified (step 426). Those GSECs have a cardinality greater than 2. Among the identified GSECs, those GSECs not yet dualized are dualized.

The Lagrangian multipliers $\lambda$ are then updated (step 428) to $\lambda^{k+1}$ and the counter k is updated to k+1. A new iteration is then started.

Conclusions

Algorithms to generate primal and dual PCSPG bounds were presented in this application. These algorithms originate from a Lagrangian NDRC based approach and incorporate ingredients such as a new PCSPG reduction test, an effective Local Search procedure and a modification in the NDRC framework which allowed additional reductions in duality gaps to be attained.

NDRC upper bounds for PCSPG turned out very sharp for almost all instances tested. In particular, optimal solutions were generated for 149 out of the 154 instances tested in sets K, P, C, D, and E. The Lagrangian heuristic that produced these bounds thus appears to dominate the best PCSPG heuristic available in the literature, according to Canuto et al., "Local search with perturbations for the prize collecting Steiner tree problem in graphics," Networks 38: 50-58 (2001). On the other hand, in terms of CPU time and lower bound quality, for test sets C, D, and E, NDRC was easily outperformed by the Branch-and-Cut algorithm described in I. Ljubic et al, "Solving the prize-collecting Steiner problem to optimality," Technical report, Technische Univeritat Wien, Institut fur Computergraphik und Algorithmen (2004), which is the best exact solution algorithm available for PCSPG. However, for test set H, the hardest to solve to proven optimality, NDRC outperformed the algorithm in I. Ljubic et al. In particular, while requiring less CPU time than that quoted in I. Ljubic et al., NDRC generated new best upper bounds for seven set H instances.

In summary, the algorithm is capable of adequately dealing with the exponentially many candidate inequalities to dualize. It incorporates ingredients such as a new PCSPG reduction test, an effective Lagrangian heuristic and a modification in the NDRC framework that allows duality gaps to be further reduced. The Lagrangian heuristic dominates its PCSPG counterparts in the literature. The NDRC PCSPG lower bounds, most of the time, nearly matched the linear programming relaxation bounds.

Applying the PCSPG algorithm of the present invention to the optimal design of access networks will increase the profit of the system; i.e., it will maximize the difference between the total revenue generated by the network and the cost of placing fiber optical cables in the network. In addition to providing a solution by indicating which arcs should have fiber, it also produces a lower bound on the cost of the optimal solution. With this lower bound a determination can be made as to how good (i.e. close to optimal) the solution found is.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for installing a conveyance linking a service provider location with customer locations selected from potential customer locations located on potential conveyance routes, the installed conveyance comprising a network yielding a total profit within a predetermined bound of a maximum possible total revenue, each potential customer location being associated with a potential customer revenue and each potential conveyance route being associated with a potential cost of the conveyance, the method comprising:

formulating an optimization problem for the network as a prize-collecting Steiner tree problem in graphs (PCSPG) with potential conveyance routes $x_e$ between locations of potential customers as edges and locations of potential customers $y_i$ as vertices, the PCSPG including a plurality of network generalized subtour elimination constraint (GSEC) inequalities;

replacing each $y_i$ with a complement $z_i=1-y_i$;

dualizing a subset of the GSEC inequalities in a Lagrangian fashion;

in a computer processor, performing the following in a subgradient method (SM) iteration k on a solution ($\overline{x}^k,\overline{z}^k$) to determine a near-optimal or optimal solution to the PCSPG:

obtaining a lower bound $w_{\lambda^k}$ to the PCSPG by performing Lagrangian relaxation on a vector of multipliers $\lambda$ corresponding to the GSEC inequalities;

terminating the iteration if ($\overline{w}-w_{\lambda^k}$)<1, where $\overline{w}$ is a previously obtained valid upper bound, the current ($\overline{x}^k,\overline{z}^k$) being determined to be the network solution;

performing a Lagrangian heuristic including a Minkoff algorithm on a solution ($\bar{x}^k, \bar{z}^k$) using complementary costs and penalties as input and using no root vertex as input, the heuristic further including a pruning algorithm using original costs and penalties as input, the heuristic producing an upper bound replacing $\bar{w}$ if the upper bound is lower than $\bar{w}$;

applying a linear programming-based reduced cost test defined by the solution ($\bar{x}^k, \bar{z}^k$) to identify edges that are not in any optimal solution, and eliminating those edges from further consideration;

dualizing those GSECs not yet dualized that violate the solution ($\bar{x}^k, \bar{z}^k$), those GSECs having a cardinality greater than 2; and updating the Lagrangian multipliers $\lambda$;

if the iteration has not been terminated and if an iteration limitation criterion has not been reached, then initiating a new iteration;

if the iteration has been terminated, or if the iteration limitation criterion has been reached, then outputting an optimal or near-optimal solution to the PCSPG; and installing the conveyance along selected potential conveyance routes according to the output solution.

2. The method of claim 1, wherein the conveyance is a telecommunications conveyance selected from the group consisting of twisted pair cable, optical fiber cable and coaxial cable.

3. The method of claim 1, wherein the conveyance is selected from the group consisting of a gas pipeline and an electric service line.

4. The method of claim 1, further comprising:
before performing the subgradient method (SM) iteration, applying reduction tests to a network of the PCSPG and updating the network accordingly; and
if the updated network is a tree, then skipping the iteration and determining that the updated network is the network solution.

5. The method of claim 1, wherein the iteration limitation criterion is a predetermined time period during which the iteration may be performed.

6. The method of claim 1, wherein the iteration limitation criterion is a predetermined number of iterations that may be performed.

7. The method of claim 1, wherein applying linear programming-based reduced cost test to identify edges that are not in any optimal solution includes computing a cost $\bar{c}_e^k$ of an edge e in the current iteration k where $\bar{c}_e^k = c_e^k - c_{e_0}^k$ where $e_0$ is an edge that is dependent on forest topology implied by ($\bar{x}^k, \bar{z}^k$).

8. The method of claim 7, wherein an edge e is eliminated if ($\bar{c}_e^k + w_{\lambda^k}$) > $\bar{w}$.

9. The method of claim 1, wherein dualizing those GSECs not yet dualized that violate the solution, further comprises:
generating a step size $$\theta^k = \frac{\alpha \lfloor \bar{w} - w_{\lambda^k} \rfloor}{\sum_{i=1,\ldots,m} (g_i^k)^2},$$

wherein $g^k$ is a subgradient associated with relaxed constraints at $\bar{x}$, $\bar{w}$ is a valid upper bound and $\alpha$ is a real number assuming values in (0,2]; and
updating Lagrangian multipliers as $\lambda_i^{k+1} = \max\{0; \lambda_i^k - \theta^k g_i^k\}$, $i=1,\ldots,m$.

10. The method of claim 9, wherein generating a step size further comprises:
extending use of GSEC inequalities in subsequent iterations by using a particular GSEC inequality in the generating step of a predetermined number of iterations after an iteration in which the GSEC inequality is not violated.

11. The method of claim 10, wherein the predetermined number of iterations is greater than 1.

12. A method for determining an optimal or near-optimal conveyance network, the network including a conveyance linking a service provider location with customer locations selected from potential customer locations located on potential conveyance routes, the optimal or near-optimal conveyance network comprising a network yielding a total profit within a predetermined bound of a maximum possible total profit, each potential customer location being associated with a potential customer revenue and each potential conveyance route being associated with a potential cost of the conveyance, the method comprising:

formulating an optimization problem for the network as a prize-collecting Steiner tree problem in graphs (PCSPG) with potential conveyance routes $x_e$ between locations of potential customers as edges and locations of potential customers $y_i$ as vertices, the PCSPG including a plurality of network generalized subtour elimination constraint (GSEC) inequalities;

replacing each $y_i$ with a complement $z_i = 1 - y_i$;

dualizing a subset of the GSEC inequalities in a Lagrangian fashion;

in a computer processor, performing the following in a subgradient method (SM) iteration k on a solution ($\bar{x}^k, \bar{z}^k$) to determine a near-optimal or optimal solution to the PCSPG:

obtaining a lower bound $w_{\lambda^k}$ to the PCSPG by performing Lagrangian relaxation on a vector of multipliers $\lambda$ corresponding to the GSEC inequalities;

terminating the iteration if ($\bar{w} - w_{\lambda^k}$) < 1, where $\bar{w}$ is a previously obtained valid upper bound, the current ($\bar{x}^k, \bar{z}^k$) being determined to be the network solution;

performing a Lagrangian heuristic including a Minkoff algorithm on a solution ($\bar{x}^k, \bar{z}^k$) using complementary costs and penalties as input and using no root vertex as input, the heuristic further including a pruning algorithm using original costs and penalties as input, the heuristic producing an upper bound replacing $\bar{w}$ if the upper bound is lower than $\bar{w}$;

applying a linear programming-based reduced cost test defined by the solution ($\bar{x}^k, \bar{z}^k$) to identify edges that are not in any optimal solution, and eliminating those edges from further consideration;

dualizing those GSECs not yet dualized that violate the solution ($\bar{x}^k, \bar{z}^k$), those GSECs having a cardinality greater than 2; and updating the Lagrangian multipliers $\lambda$;

if the iteration has not been terminated and if an iteration limitation criterion has not been reached, then initiating a new iteration;

if the iteration has been terminated, or if the iteration limitation criterion has been reached, then determining that the current solution to the PCSPG is the optimal or near-optimal conveyance network.

13. The method of claim 12, further comprising:
before performing the subgradient method (SM) iteration, applying reduction tests to a network of the PCSPG and updating the network accordingly; and if the updated network is a tree, then skipping the iteration and determining that the updated network is the optimal or near-optimal conveyance network.

14. The method of claim 12, wherein the iteration limitation criterion is a predetermined time period during which the iteration may be performed.

15. The method of claim 12, wherein the iteration limitation criterion is a predetermined number of iterations that may be performed.

16. The method of claim 12, wherein applying linear programming-based reduced cost test to identify edges that are not in any optimal solution includes computing a cost $\bar{c}_e^k$ of an edge e in the current iteration k where $\bar{c}_e^k = c_e^k - c_{e_0}^k$ where $e_0$ is an edge that is dependent on forest topology implied by ($\bar{x}^k$, $\bar{z}^k$).

17. The method of claim 16, wherein an edge e is eliminated if $(\bar{c}_e^k + w_{\lambda_e}) > \bar{w}$.

18. The method of claim 12, wherein dualizing those GSECs not yet dualized that violate the solution, further comprises:
generating a step size $$\theta^k = \frac{\alpha \lfloor \bar{w} - w_{\lambda^k} \rfloor}{\sum_{i=1,\ldots,m} (g_i^k)^2},$$

wherein $g^k$ is a subgradient associated with relaxed constraints at $\bar{x}$, $\bar{w}$ is a valid upper bound and $\alpha$ is a real number assuming values in (0,2]; and
updating Lagrangian multipliers as $\lambda_i^{k+1} \equiv \max\{0; \lambda_i^k - \theta^k g_i^k\}$, i=1, . . . , m.

19. The method of claim 18, wherein generating a step size further comprises:
extending use of GSEC inequalities in subsequent iterations by using a particular GSEC inequality in the generating step of a predetermined number of iterations after an iteration in which the GSEC inequality is not violated.

20. A non-transitory computer-usable medium having computer readable instructions stored thereon for execution by a processor to perform a method for determining an optimal or near-optimal conveyance network, the network including a conveyance linking a service provider location with customer locations selected from potential customer locations located on potential conveyance routes, the optimal or near-optimal conveyance network comprising a network yielding a total profit within a predetermined bound of a maximum possible total revenue, each potential customer location being associated with a potential customer revenue and each potential conveyance route being associated with a potential cost of the conveyance, the method comprising:
formulating an optimization problem for the network as a prize-collecting Steiner tree problem in graphs (PCSPG) with potential conveyance routes $x_e$ between locations of potential customers as edges and locations of potential customers $y_i$ as vertices, the PCSPG including a plurality of network generalized subtour elimination constraint (GSEC) inequalities;
replacing each $y_i$ with a complement $z_i = 1 - y_i$;
dualizing a subset of the GSEC inequalities in a Lagrangian fashion;
performing the following in a subgradient method (SM) iteration k on a solution ($\bar{x}^k, \bar{z}^k$) to determine a near-optimal or optimal solution to the PCSPG:
obtaining a lower bound $w_{\lambda^k}$ to the PCSPG by performing Lagrangian relaxation on a vector of multipliers $\lambda$ corresponding to the GSEC inequalities;
terminating the iteration if $(\bar{w} - w_{\lambda^k}) < 1$, where $\bar{w}$ is a previously obtained valid upper bound, the current ($\bar{x}^k, \bar{z}^k$) being determined to be the network solution;
performing a Lagrangian heuristic including a Minkoff algorithm on a solution ($\bar{x}^k, \bar{z}^k$) using complementary costs and penalties as input and using no root vertex as input, the heuristic further including a pruning algorithm using original costs and penalties as input, the heuristic producing an upper bound replacing $\bar{w}$ if the upper bound is lower than $\bar{w}$;
applying a linear programming-based reduced cost test defined by the solution ($\bar{x}^k, \bar{z}^k$) to identify edges that are not in any optimal solution, and eliminating those edges from further consideration;
dualizing those GSECs not yet dualized that violate the solution ($\bar{x}^k, \bar{z}^k$), those GSECs having a cardinality greater than 2; and
updating the Lagrangian multipliers $\lambda$;
if the iteration have not been terminated and if an iteration limitation criterion has not been reached, then initiating a new iteration;
if the iteration has been terminated, or if the iteration limitation criterion has been reached, then determining that the current solution to the PCSPG is the optimal or near-optimal conveyance network.

* * * * *